United States Patent [19]
Friedman

[11] Patent Number: 5,953,096
[45] Date of Patent: Sep. 14, 1999

[54] UNIVERSAL CENTER BRIDGE MOUNTING MECHANISM FOR CLIP-ON SUNGLASSES

[76] Inventor: Dean Friedman, 61 Ulster Ave., Atlantic Beach, N.Y.

[21] Appl. No.: 09/092,202

[22] Filed: Jun. 5, 1998

[51] Int. Cl.⁶ ...................................................... G02C 9/00
[52] U.S. Cl. ................................................................ 351/47
[58] Field of Search .......................................... 351/47, 57

[56] References Cited

U.S. PATENT DOCUMENTS

| | | | |
|---|---|---|---|
| D. 336,308 | 6/1993 | Shelton | D16/330 |
| D. 350,359 | 9/1994 | Friedman | D16/334 |
| 3,575,497 | 4/1971 | LeBlanc | 351/47 |
| 3,876,295 | 4/1975 | Loughner | 351/47 |
| 4,890,910 | 1/1990 | Gazeley | 351/47 |
| 5,123,724 | 6/1992 | Salk | 351/47 |
| 5,164,749 | 11/1992 | Shelton | 351/47 |
| 5,258,786 | 11/1993 | Penrod | 351/47 |

*Primary Examiner*—Huy Mai
*Attorney, Agent, or Firm*—Robert L. Epstein; Harold James; James & Franklin, LLP

[57] ABSTRACT

Spaced prong arms, spring loaded toward an initial position, are moved relative to fixed prong arms, against the spring force, to a position for engagement of opposing sections of the eyeglasses frame. The ends of the prong arms are shaped to receive the frame. The spring force causes the prong arms to securely retain the eyeglasses frame. In one embodiment, the moveable prong arms are associated with a coil spring. Movement of the prong arms compresses the spring, which urges the prong arms toward an expanded position. In a second embodiment, the moveable prong arms are leaf springs. The springs flex to permit the frame to be inserted. The ends of the prong arms may be plastic coated to protect the eyeglasses frame.

18 Claims, 5 Drawing Sheets

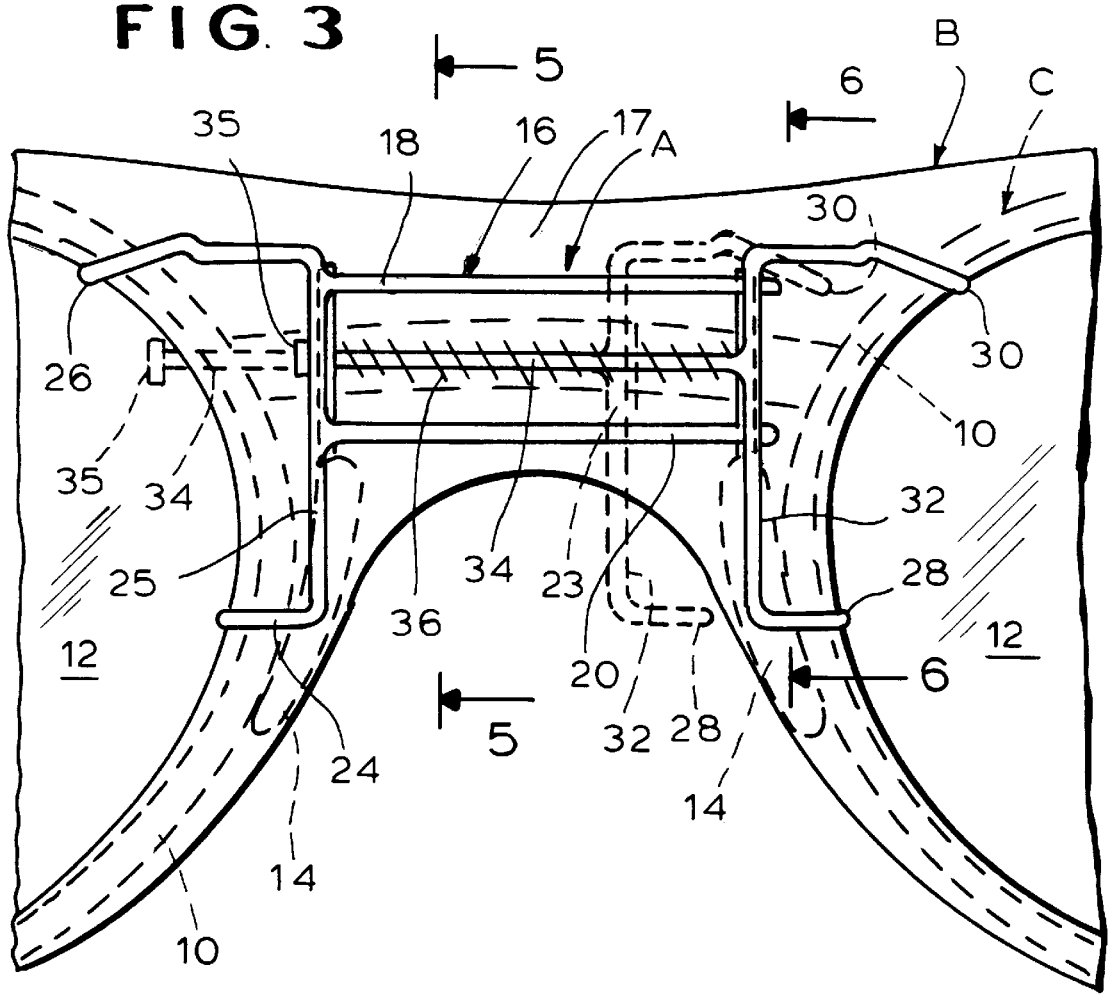
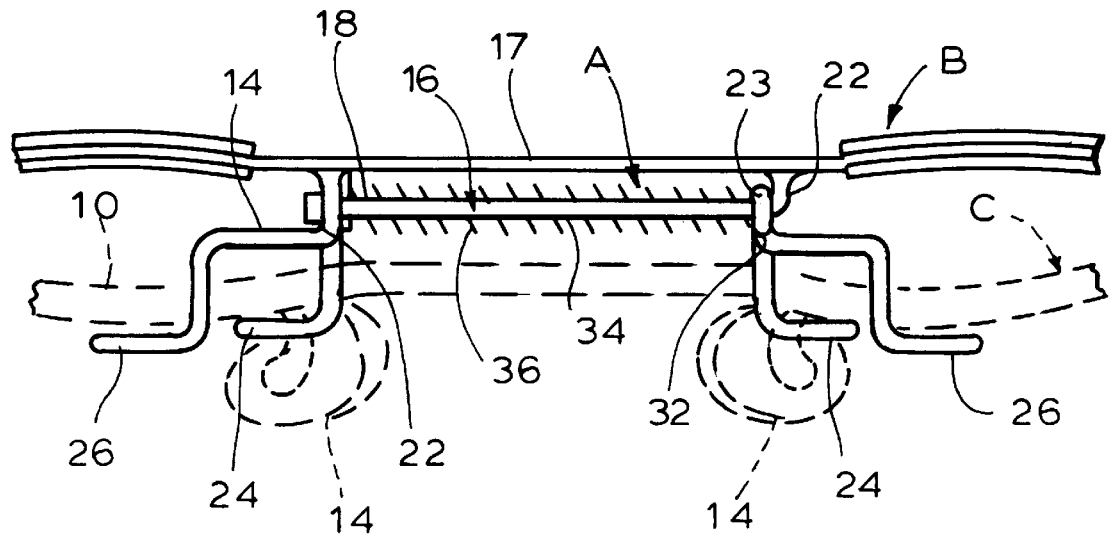

UNIVERSAL CENTER BRIDGE MOUNTING MECHANISM FOR CLIP-ON SUNGLASSES

The present invention relates to clip-on sunglasses and more particularly to a mechanism for removeably mounting clip-on sunglasses on eyeglasses which is adapted to fit a large number of different size and shape eyeglasses configurations.

Clip-on sunglasses consist of a "front" which includes a metal or plastic frame which carries two light attenuating plastic or glass lenses. A mechanism is provided for removeably mounting the clip-on sunglasses front on eyeglasses. Conventional mounting mechanisms either attach to the bridge of the eyeglasses (known as "center bridge mount") or to the periphery of the frame.

In order to be commercially acceptable, the clip-on sunglasses must be light in weight, rugged and inexpensive. They must be easy to mount and to remove from the eyeglasses. They must also mount without damaging the eyeglasses, particularly the lenses.

One common type of center bridge mounting mechanism utilizes a clamp attached to the bridge of the clip-on sunglasses front. The clamp includes pairs of opposing clamp parts which are spring loaded toward each other so as to frictionally retain the bridge and/or the lenses of the eyeglasses therebetween. Examples of this type of clamp are disclosed in U.S. Pat. No. 3,575,497 issued Apr. 20, 1971 to Leblanc, U.S. Pat. No. 8,164,749 issued Nov. 17, 1992 to Shelton and U.S. Design Pat. No. Des 350,359 issued Sep. 6, 1994 to Friedman.

These prior art clamp mechanisms have the advantage of being able to fit a variety of different eyeglasses styles. However, they have their drawbacks. The clamp mechanism consists of several parts which must be fabricated and assembled, making them relatively expensive and not very reliable. The parts clamp tightly to the lenses, potentially scratching the lenses. Moreover, they may obstruct the view partially.

The peripheral type mounting mechanism are essentially a number of prongs fixed along the frame so as to "snap fit" over the eyeglasses frame. One example of this type of clip-on mount is illustrated in U.S. Pat. No. 5,123,724 issued Jun. 23 1992 to Salk. However, this type of mounting mechanism must exactly fit each different size and shape eyeglasses frame, creating an inventory nightmare or requiring each clip-on to be custom made to fit a particular eyeglasses.

In order to overcome these drawbacks, I have invented a center bridge type mechanism for mounting a clip-on sunglasses front which is capable of fitting a wide variety of different size and shape eyeglasses and is simple, cost effective, reliable. It does not contact or clamp the lenses of the eyeglasses, so it cannot scratch them.

My invention utilizes two sets of prong arms. One set is moveably mounted on the assembly such that they can be moved, against a spring force, to a position to receive the eyeglasses frame. The spring force causes the prong arms to frictionally engage the frame. The lenses of the eyeglasses are not clamped or otherwise engaged.

It is, therefore, a prime object of the present invention to provide a center bridge mechanism for mounting clip-on sunglasses designed for use with a wide variety of different size and shape eyeglasses.

It is another object of the present invention to provide a mechanism for mounting clip-on sunglasses which cannot scratch or damage the eyeglasses lenses or obstruct vision.

It is another object of the present invention to provide a mechanism for mounting clip-on sunglasses on eyeglasses which is simple, reliable and inexpensive.

In accordance with one aspect of the present invention, means are provided for mounting clip-on sunglasses on eyeglasses of the type having a frame with spaced portions. The sunglasses include a base, fixed prong means mounted on the base and prong means moveable relative to said fixed prong means from an initial position to a second position to permit engagement of the spaced frame portions. Spring means are provided for urging the moveable prong means toward the initial position.

The assembly further includes means for moveably mounting the moveable prong means on the base.

Means are provided for mounting the fixed prong means in a fixed position on said base.

The spring means may include a coil spring. In that case, the second position is closer to the fixed prong means than the initial position. The spring means may, alternatively, be a leaf spring, in which case the second position is remote from the fixed prong means as compared to the initial position.

Preferably, each of the prong means comprises first and second prong arms. The end of each prong arm is formed to retain the frame of the eyeglasses.

In accordance with another aspect of the present invention, apparatus is provided for mounting on eyeglasses of the type having a frame with spaced positions. The mounting means includes a base affixed to the clip-on sunglasses, a fixed prong means mounted on the base and moveable prong means mounted on the base. Means are provided for mounting the moveable prong means for movement relative to the fixed prong means between an initial position and a retracted position. Coil spring means are provided for urging the moveably mounted prong means towards the initial position to engage the frame of the eyeglasses.

The moveable prong means includes first and second prong arms moveable as a unit.

The base has an opening. The rod which carries the coil spring is moveably received in the opening. The moveable prong arms are mounted on the rod. The rod is moveable from an extended position to a retracted position to move the moveable prong arms from its initial position to the retracted position.

The base includes first and second spaced, substantially parallel rails to which the fixed prong arms are mounted. The rod extends between the rails. The bracket which carries the moveable prong arms includes means for moveably engaging the rails.

In accordance with another aspect of the present invention, apparatus are provided for mounting clip-on sunglasses on eyeglasses of the type including frame portions. The apparatus includes a base with fixed prong means and moveable prong means extending from the base. Means are provided for mounting the moveable prong means for movement relative to the fixed prong means. The moveable prong means comprises a leaf spring for urging the moveable prong means toward the initial position.

The apparatus further includes second fixed prong means and second moveable prong means. The second moveable prong means comprise a second leaf spring.

The fixed prong means includes first and second prong arms which extend from the base is substantially opposite directions. The moveable prong means includes third and forth prong arms extending from the base is substantially orthogonal directions.

To these and to such other objects which hereinafter appear, the present invention relates to a universal center bridge mounting mechanism for clip-on sunglasses, as set forth in detail in the following specification and recited in the annexed claims, taken together with the accompanying drawings in which like numerals refer to like parts and in which:

FIG. 3 is an enlarged fragmenting view of the mounting means of FIG. 1;

FIG. 4 is a top view of the mounting means of FIG. 3;

FIGS. 1–6 illustrate the first (coil spring) preferred embodiment of the present invention. The mounting mechanism, generally designated A, is affixed to the bridge of the clip-on sunglasses front, generally designated B. Mechanism A serves to removeably mount sunglasses front B on a pair of eyeglasses, generally designed C. Eyeglasses C consist of a frame 10, lenses 12 and a pair of nose pads 14.

Figure 1:
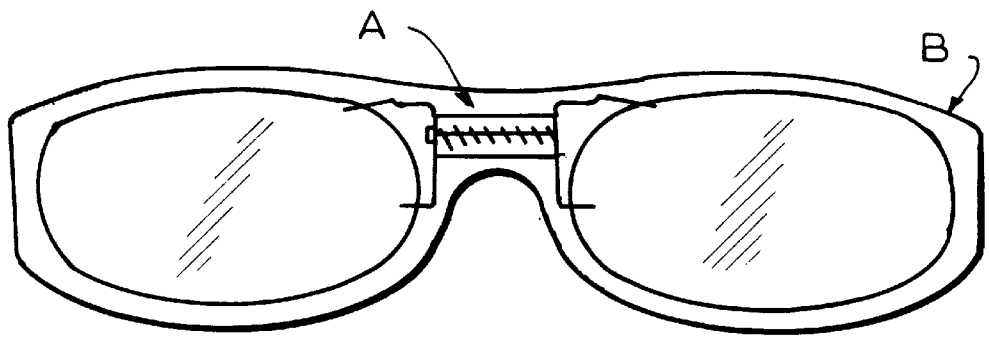
FIG. 1 is a rear plan view of a clip-on sunglasses front with the mounting means of the first preferred embodiment of the present invention.
Figure 2:
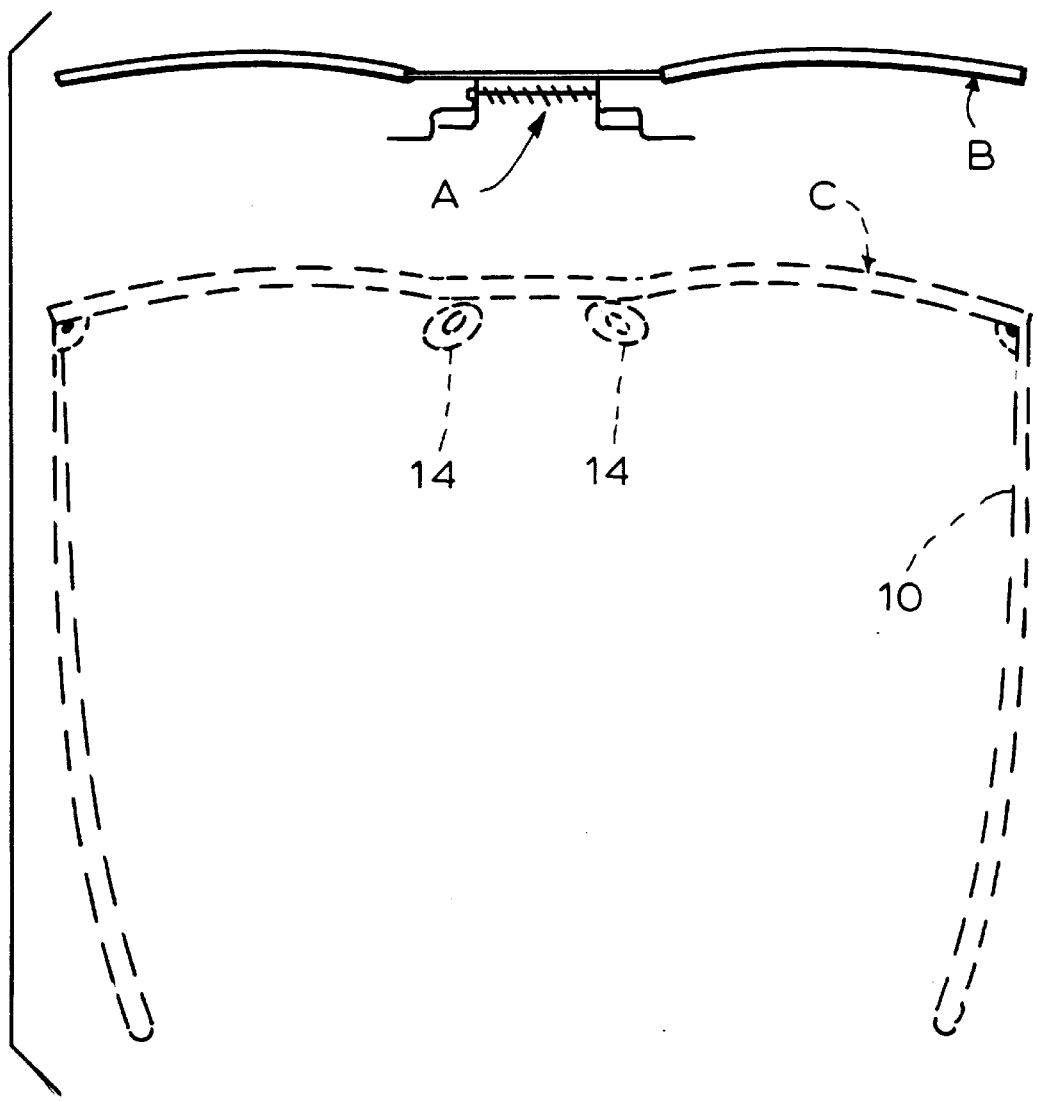
FIG. 2 is a top exploded view of the clip-on sunglasses unit of FIG. 1 and a pair of eyeglasses.
Figure 5:
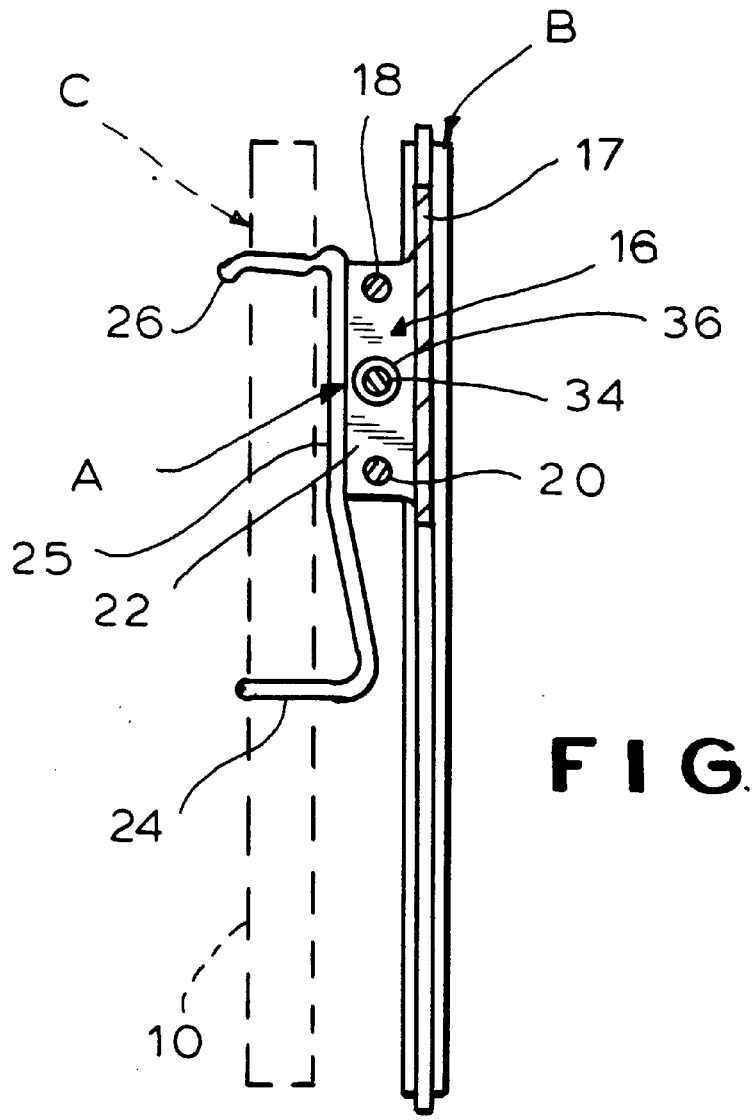
FIG. 5 is a side elevational view taken along line 5—5 of FIG. 3.
Figure 6:
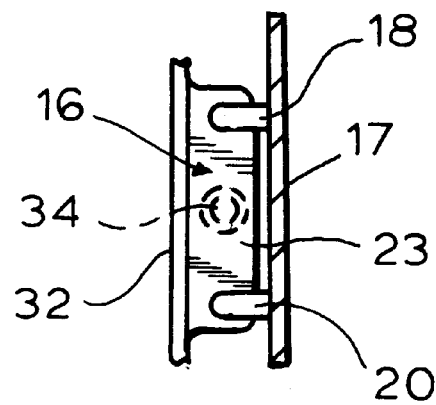
FIG. 6 is a side elevational view taken along line 6—6 of FIG. 3.
Figure 7:
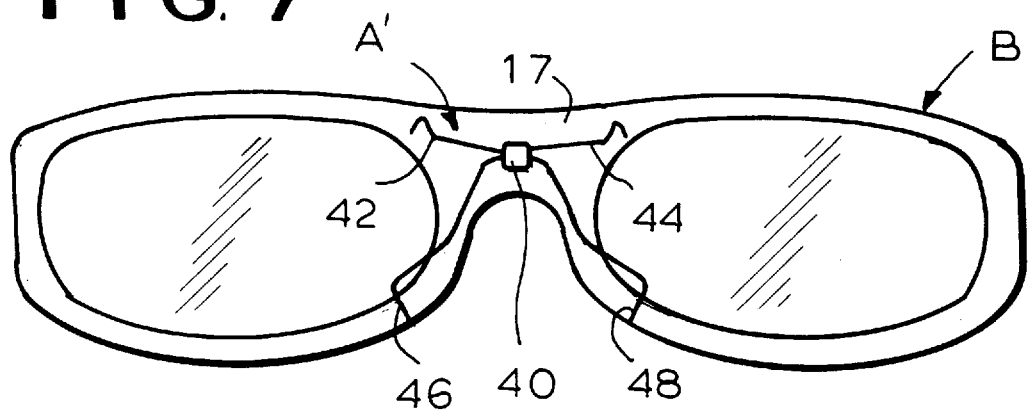
FIG. 7 is a rear plan view of a clip-on sunglasses front with the mounting means of the second preferred embodiment of the present invention.
Figure 8:
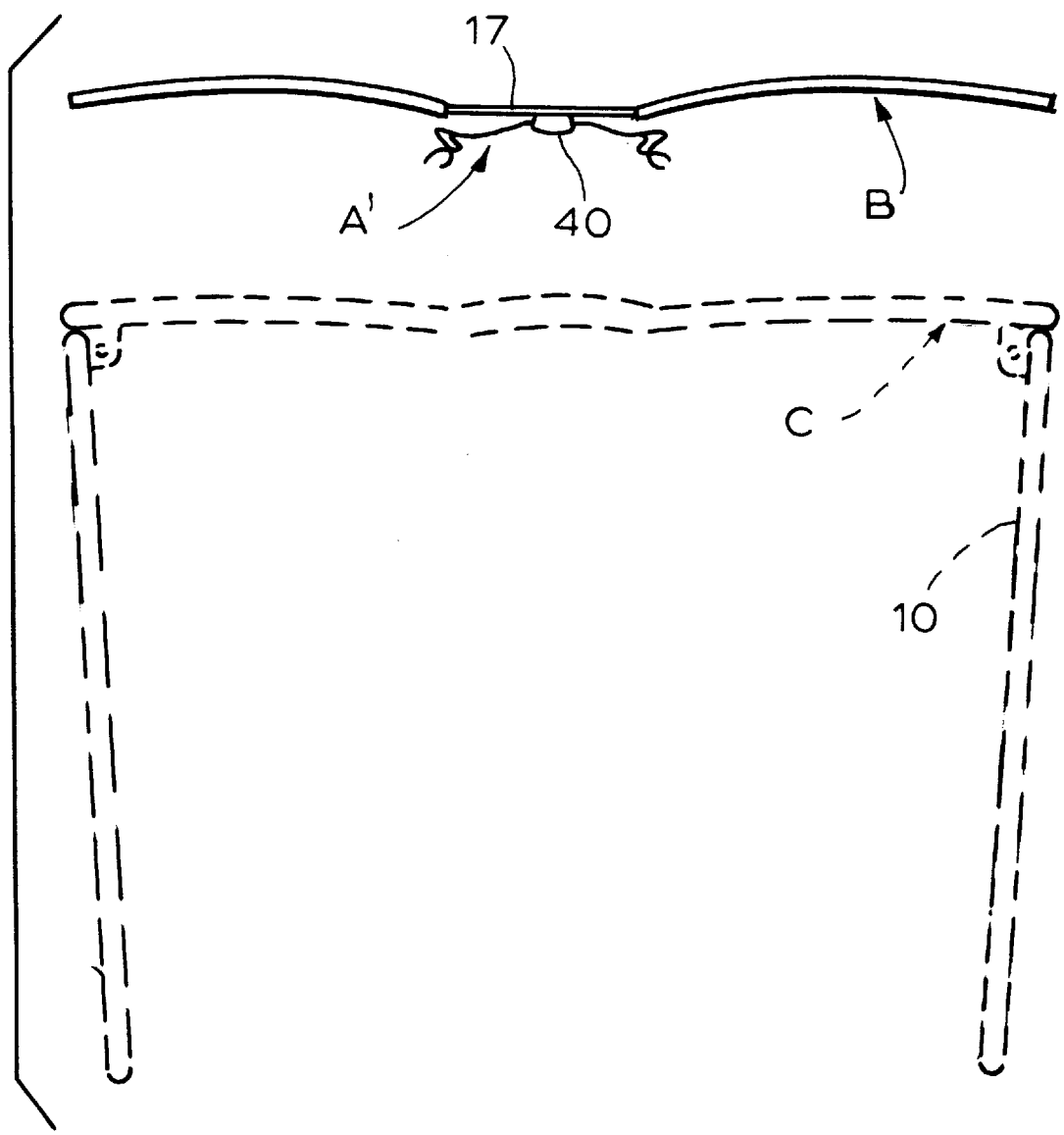
FIG. 8 is a top exploded view of the clip-on sunglasses unit of FIG. 5 and a pair of eyeglasses.
Figure 9:
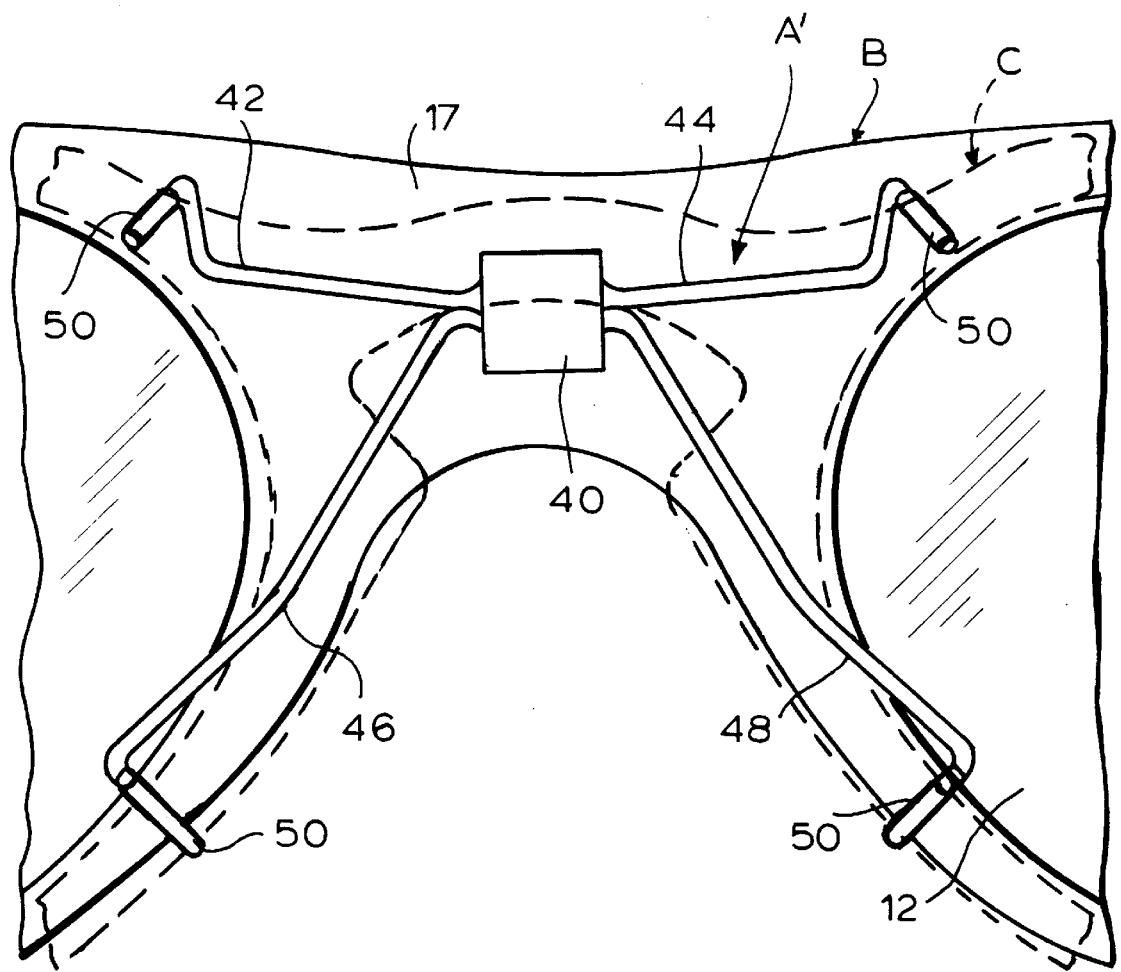
FIG. 9 is an enlarged fragmenting view of the mounting means of FIG. 5.
Figure 10:
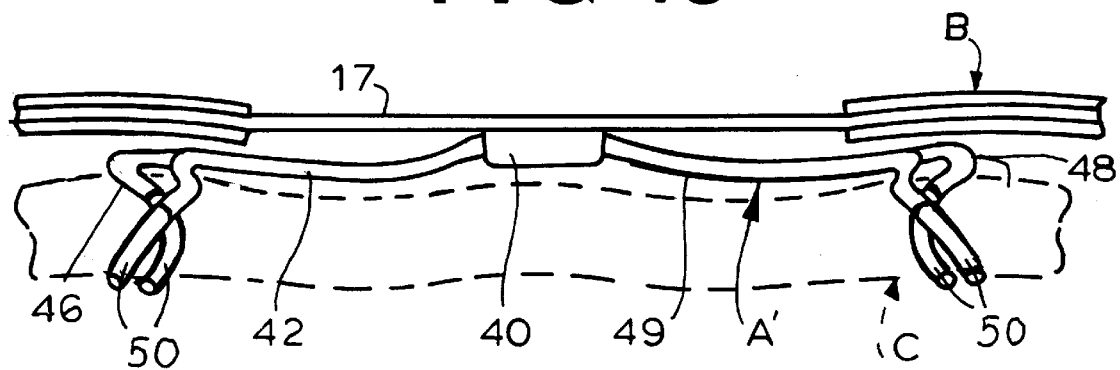
FIG. 10 is a top view of the mounting means of FIG. 7.

As best seen in FIGS. 3 and 4, mechanism A includes a base 16 fixed to the bridge 17 of sunglasses front B by welding or adhesive. Base 16 includes a pair of spaced, subtantially parallel rails 18, 20 and a pair of spaced brackets 22, 23. Bracket 22 is secured to bridge 17. As seen in FIGS. 5 and 6, one end of each of the rails 18, 20 is fixed to bracket 22. The rails extend through openings in bracket 23 and terminate in ends which are bent and affixed to the surface of bridge 17. The intermediate portions of rails 18, 20 are spaced a short distance from the surface of the bridge 17 to permit bracket 23 to move freely along the rails. Mounted on part 22 is a bar 25. Mounted on bar 25, in spaced, generally parallel relation, are a pair of fixed prong arms 24, 26. Prong arm 26 is longer than prong arm 24.

A second pair of prong arms 28, 30 are mounted as a unit on a second bar 32. Bar 32 is carried by bracket 23. Bracket 23 is affixed to one end of a rod 34. The other end of rod 34 extends through an opening formed in bracket 22, at a point between rails 18 and 20. A cap 35 is situated on the end of rod 34 to act as a stop. A compression spring 36 surrounds rod 34 and extends between brackets 22 and 23. Bracket 23 has spaced openings to accept rails 18, 20.

FIG. 3 shows the prong arms 28, 30 in the initial position, in which bracket 23 is furthest from bracket 22 and coil spring 36 is fully extended. In order to mount the clip-on, bar 32 and bracket 23 are moved toward bar 25 and bracket 22 to compress spring 36 as shown in phantom in FIG. 3 such that the ends of prong arms fit between opposing sections of the eyeglass frame 10. The clip-on is aligned with the eyeglasses and the parts released such that the spring moves bar 32 and bracket 23 toward their initial position, causing the prong arms to engage opposing portions of frame 10. As seen in FIG. 4, the ends of the prong arms are shaped to accept and retain the eyeglasses frame portions.

Compressing spring 36 by manually moving bracket 23 relative to bracket 22, such that the distance between the prong arms is reduced, permits the ends of the prong arms to be inserted between the opposing frame portions. Releasing the mechanism causes spring 36 to urge rod 34 back toward its initial position such that the prong arms are urged to securely retain the eyeglasses frame.

The second preferred embodiment is illustrated in FIGS. 5–8. In the first embodiment, the moveable prong arms 28, 30 are mounted on bar 32 for movement as a unit, using a single compressible coil spring. By way of contrast, the moveable prong arms in the second embodiment are individually mounted on the base and comprise leaf springs which permit the prong arms to flex to receive the eyeglasses.

As best seen in FIGS. 7 through 10, mounting mechanism A' consists of a base 40 fixedly mounted on bridge 17 of sunglasses front B by welding, adhesive or any appropriate method. Extending outwardly in substantially opposite directions from base 40 are a pair of fixed prongs, comprising relatively rigid, short arms 42, 44. Each of the fixed prong arms 42, 44 is paired with a moveable prong arm. The moveable prong arms also extend from the opposite sides of base 40 but are bent to form approximately a 90° angle with respect to each other. The moveable prongs arms comprise relatively long shafts 46, 48 made of metal so as to form leaf springs. Prong arms 46, 48 extend in subtantially orthongonal directions in the initial position.

The ends of fixed prong arms 42 and 44 and of moveable prong arms 46, 48 are bent to form frame receiving recesses. The recesses of prong arms 42, 44 are oppositely oriented relative to the recesses in prong arms 46, 48 so as to retain the eyeglasses therebetween.

After aligning prong arms 42, 44 such that the frame of eyeglasses C is received in the recesses in the prong arms, moveable prong arms 46, 48 are moved away from the fixed prong arms (and towards each other) so as to cam over the frame portions. Releasing the moveable prong arms causes the leaf spring action to urge the prong arms to return to their initial positions, so as to securely retain the eyeglasses frame therebetween.

Preferably, the ends of prong arms 42, 44, 46 and 48 are provided with a plastic coating or sleeve 50. This prevents damage to the eyeglasses frame.

It will now be appreciated that the present invention relates to a central bridge mechanism for mounting clip-on sunglasses on eyeglasses which can be used with a wide variety of different size and shaped eyeglasses to mount fashion sunglasses fronts without contacting or damaging the eyeglass lenses. Opposing sets of spring loaded prong arms are moveable to engage the eyeglasses frame. The spring force retains the clip-on on the eyeglasses frame. The ends of the prong arms securely receive the frame.

While only a limited number of preferred embodiments have been disclosed herein for purposes of illustration, it should be obvious that many modifications and variations could be made thereto. It is intended to cover all of these modifications and variations which fall within the scope of the invention, as defined by the following claims:

I claim:

1. Apparatus for mounting clip-sunglasses on eyeglasses having a frame, said apparatus comprising a base, prong means fixedly mounted on said base, prong means mounted on said base for movement relative to said fixed prong means between a retracted position relatively near said fixedly mounted prong means and an extended position relatively remote from said fixed prong means and spring means for urging said moveable prong means toward said extended position to retain said frame.

2. The apparatus of claim 1 further comprising means for moveably mounting said moveable prong means on said base.

3. The apparatus of claim 1 wherein said spring means comprises a coil spring.

4. The apparatus of claim 1 wherein said fixed prong means comprises first and second prong arms and said moveable prong means comprises third and fourth prong arms.

5. Apparatus for mounting clip-on sunglasses on eyeglasses having a frame, comprising a base fixed to said clip-on sunglasses, prong means fixedly mounted on said base, means for mounting prong means on said base for movement relative to said fixed prong means, between a first position and a second position and coil spring means for urging said moveable prong means towards said second position to engage said frame.

6. The apparatus of claim 5 wherein said moveable prong means comprises first and second prong arms moveable as a unit.

7. The apparatus of claim 5 wherein said base has an opening and said mounting means further comprises a rod which carries said coil spring, said rod being received in said base opening.

8. The apparatus of claim 7 wherein said moveable prong means is mounted on said rod.

9. The apparatus of claim 8 wherein said rod is moveable from an extended position to a retracted position to move the moveable prong means toward said first position.

10. The apparatus of claim 7 wherein said base comprises first and second spaced, substantially parallel rails.

11. The apparatus of claim 10 wherein said fixed prong means are mounted to the rails.

12. The apparatus of claim 10 wherein said rod extends between said rails.

13. Apparatus for mounting clip-on sunglasses on eyeglasses having a frame with spaced portions, comprising a base affixed to said clip-on sunglasses, prong means fixedly mounted on said base, prong means moveably mounted on said base, means for mounting said moveable prong means for movement relative to said fixed prong means between an initial position and a retracted position and coil spring means for urging said moveable prong means towards said initial position to engage said spaced frame portions, wherein said base has an opening and said mounting apparatus further comprises a rod which carries said coil spring means, said rod being received in said base opening, wherein said moveable prong means is mounted on said rod, wherein said rod is moveable from an extended position to a retracted position to move the moveable prong means from its initial position toward its retracted position.

14. Apparatus for mounting clip-on sunglasses on eyeglasses having a frame, said apparatus comprising a base, first and second prong means extending from said base and each having a part adapted to engage said frame, said first prong means comprising a first leaf spring arm, extending between said base and said part, for urging said frame engaging part of said first prong means toward said frame engaging part of said second prong means, to retain the frame therebetween.

15. The apparatus of claim 14 wherein said first prong means comprises a second frame engaging part and a second leaf spring arm extending between said base and said second frame engaging part.

16. The apparatus of claim 15 wherein said first and second leaf spring arms of said first prong means extend in substantially opposite directions.

17. The apparatus of claim 14 where said second prong means comprises a second frame engaging part and a second leaf spring arm extending between said base and said second frame engaging part.

18. The apparatus of claims 14 wherein said first and second prong means extend in substantially orthogonal directions.

\* \* \* \* \*